May 9, 1933.　　C. G. JOHNSON　　1,908,253
GAUGE
Filed May 31, 1930　　2 Sheets-Sheet 1
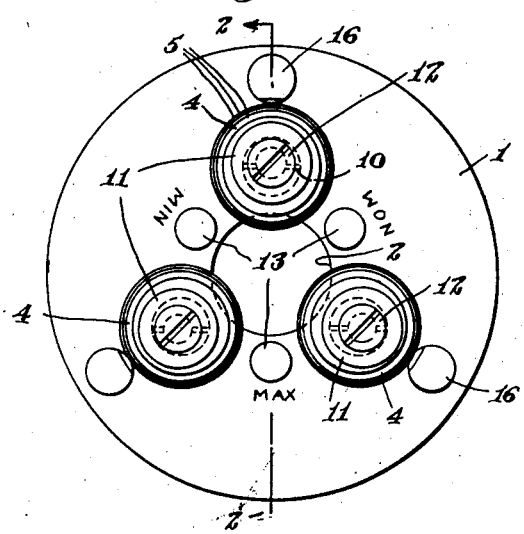
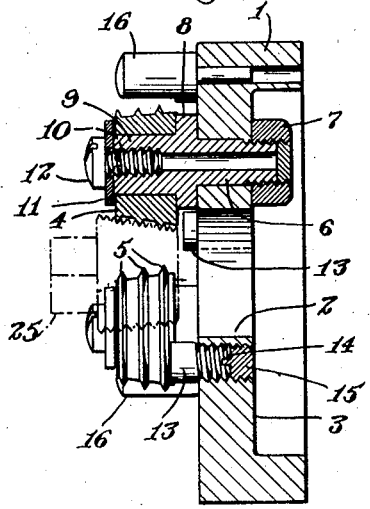
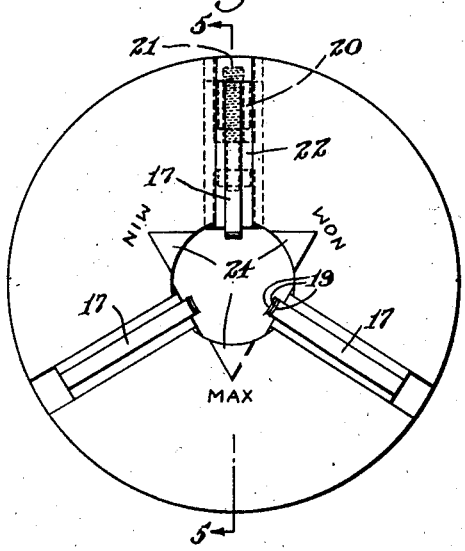
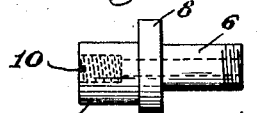
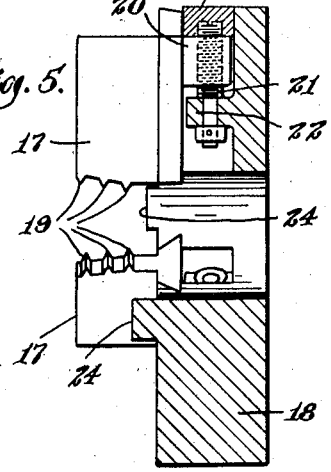
Inventor
Charles G. Johnson
by Attorney

May 9, 1933.  C. G. JOHNSON  1,908,253
GAUGE
Filed May 31, 1930   2 Sheets-Sheet 2
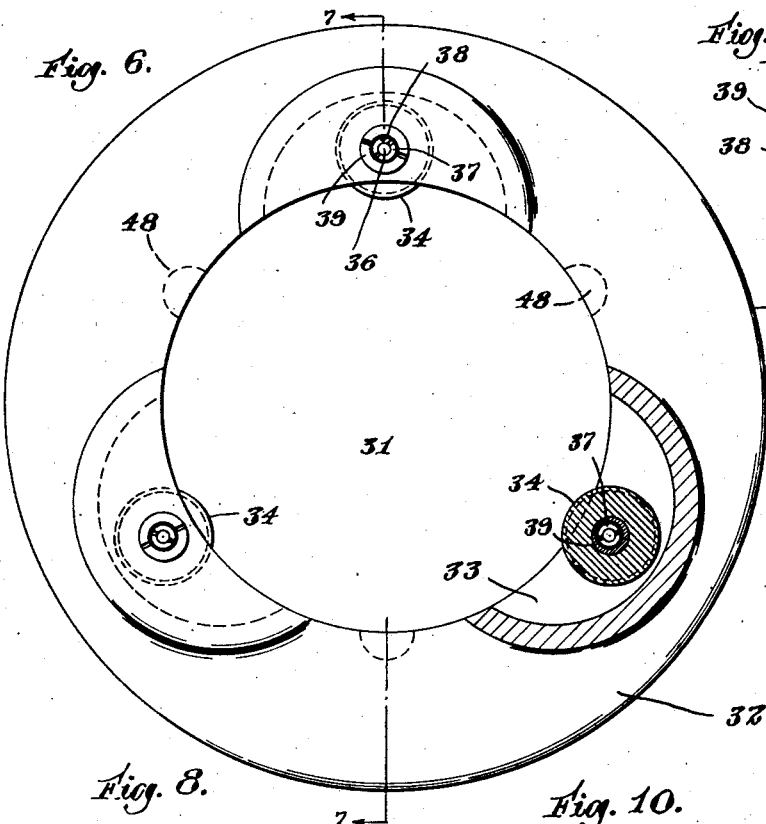
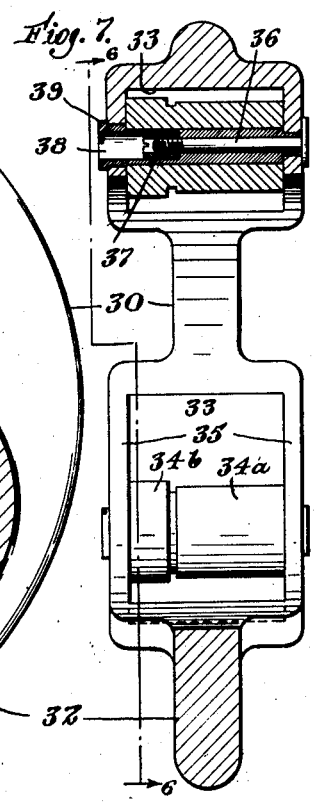
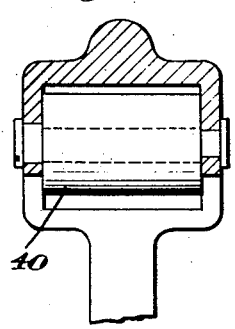
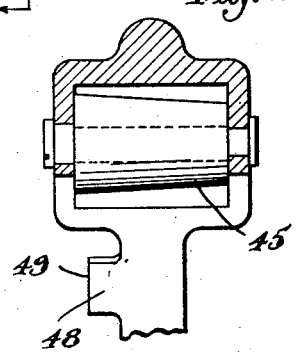
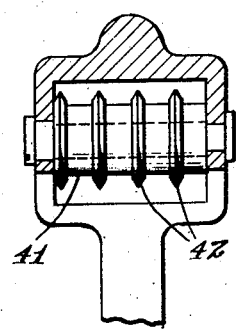
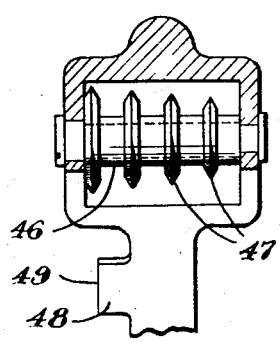
Inventor
Charles G. Johnson
by Laurie L. Witter
Attorney Patented May 9, 1933

1,908,253

UNITED STATES PATENT OFFICE

CHARLES G. JOHNSON, OF HARTFORD, CONNECTICUT, ASSIGNOR TO PRATT & WHITNEY COMPANY, OF HARTFORD, CONNECTICUT, A CORPORATION OF NEW JERSEY

GAUGE

Application filed May 31, 1930. Serial No. 458,336.

This invention relates to gauges for measuring plain or threaded work pieces of either cylindrical or conical form and this application is a continuation in part of my co-pending application Serial No. 316,004, filed October 30, 1928. In its preferred form the gauge comprises a body member and three relatively and preferably equally spaced gauging anvils for making a threepoint gauging contact with the work to be gauged and these anvils may have their gauging faces shaped and formed to the contour it is desired to gauge. The anvils are so mounted on the body member that the functioning of the gauge, and particularly the contact of the anvils with the work being gauged, is fully exposed for observation. Furthermore, in the preferred form of the invention, the gauging anvils are freely rotatable rolls which are subject to little wear and, therefore, of superior accuracy and longer life. The primary object of the invention is to provide an improved type of gauge for serving these functions in a superior manner.

In one of its embodiments, my invention relates more especially to an improved type of thread gauge particularly for the purpose of gauging taper threads. The means heretofore commonly used for this purpose has been the well-known ring gauge. In use, this gauge is screwed onto the taper threaded piece to be gauged and the size accuracy thereof is determined by observing how nearly flush the end of the threaded piece comes to the face of the gauge when the gauge is fully screwed thereon. This gauge has various objectionable features and is quite inefficient where fine gauging accuracy is required.

One object of my invention herein is to provide a taper thread gauge which will meet the fine accuracy requirements now placed upon taper threads due to the development of certain classes of machinery and other mechanical devices. In this respect, particular reference is made to high pressure boilers, electric and mechanical refrigeration and pneumatic machinery. In practically all these cases either gas or liquids are used which must be conveyed through pipe lines under extremely high pressure. This necessitates very accurate joints, which joints are, of course, produced by the fitting of several pipes together by means of taper threads. Because of thread inaccuracy these joints have in many cases been soldered or filled-in in some way so that the thread is not relied upon entirely to hold the gas or liquid. For several reasons, however, soldering or filling-in is objectionable and cannot be used owing to the nature of the work and the thread itself must, therefore, be relied upon to properly serve its purpose.

The use of the conventional type of ring gauge has given no assurance of an accurate thread for this purpose, primarily because of the inability to see the actual contact between the gauge and the threads of the piece being gauged and because of the fact that the gauge itself becomes worn very rapidly. This type of gauge has, therefore, not met the requirements placed upon it by these new developments. My invention herein provides a gauge which overcomes both these objections and which will in use assure the required thread joint accuracy.

In the accompanying drawings I have illustrated certain specific embodiments of my invention but it will be understood that the invention can be otherwise embodied and that the drawings are not to be construed as defining or limiting the scope of the invention, the claims appended hereto being relied upon for that purpose.

Referring to the figures of the drawings:

Fig. 1 is a front face view of one embodiment of my improved gauge particularly adapted for gauging tapered threaded pieces;

Fig. 2 is a sectional view taken on line 2—2 of Fig. 1;

Fig. 3 is a detail view showing one of the members on which the gauging elements are mounted;

Fig. 4 is a front face view of a gauge embodying a modified form of the invention shown in Figs. 1—3;

Fig. 5 is a sectional view taken on line 5—5 of Fig. 4;

Fig. 6 is a face view of a form of my improved gauge adapted to measure plain cylindrical work, this view being partially in section on line 6—6 of Fig. 7;

Fig. 7 is a sectional view therethrough on line 7—7 of Fig. 6;

Fig. 8 is a fragmentary view of the gauge provided with a plain cylindrical gauging anvil;

Fig. 9 is a fragmentary view of the gauge provided with a threaded cylindrical gauging anvil;

Fig. 10 is a fragmentary view of a form of my improved gauge adapted to measure plain conical work; and Fig. 11 is a like view of the gauge provided with a threaded conical gauging anvil.

My improved gauge comprises a body member on which are mounted a plurality, preferably three, of gauging anvils. These anvils may be rigidly but adjustably secured to the body member or they may be freely rotatable gauging rolls, and the anvils are so relatively spaced as to receive therebetween and make gauging contact with a piece to be gauged. The gauging faces of the anvils are shaped to correspond to the shape of the piece to be gauged, i. e., either cylindrical or conical, and such faces may be either plain or threaded. The mounting of the anvils on the gauge body is such that the gauging contact between the anvils and the work pieces may at all times be clearly visible to the operator.

Certain forms of my improved gauge will also embody further means for indicating the size accuracy of the work while it is being gauged. In the gauge for use with conical work, this means will preferably embody maximum and minimum elements located on the gauge body or on any of its parts which may conveniently serve the purpose as, for example, on one or more of the gauging anvils. As illustrated in Fig. 1 and elsewhere in the drawings, this means is in the form of two lugs carried by the body adjacent to and preferably between the gauging anvils. Three of these lugs are preferably provided and are respectively termed minimum, nominal and maximum. In a threaded taper gauge of this type the height of the nominal lug is such that its outer face corresponds exactly with the end of a threaded piece of perfect taper and size when such piece is screwed into full contact with the gauging anvils. The standard working tolerances are usually one thread plus or minus. The heights of the minimum and maximum lugs are, therefore, for this purpose respectively the distance of one thread below and above the nominal.

In using the taper gauge, the work piece is placed into full contact with the gauging anvils. The size and accuracy is then observed by noticing the position of the end of the work piece relative to the three lugs. Should the end of the piece extend beyond the end of the minimum lug the piece is too small to be suitable, and should the end of the piece be outside the maximum lug the piece is too large. In the thread gauge the thread form accuracy as well as the lead and taper accuracy may be observed by holding the gauge up to the light and studying the gauging contact, as seen in Fig. 2.

Referring to Figs. 1—3 of the drawings, 1 indicates the body member of my improved gauge, which member is provided with a central hole 2 therethrough and the rear face of which is preferably countersunk at 3. In the preferred form of my invention I use annular grooved gauging anvils or rolls 4 similar to the gauging rolls shown in my Patent No. 1,671,032. The periphery of each roll is annularly grooved to provide a plurality of thread engaging annuli 5. Each such annulus is accurately ground to the form of the thread to be gauged. The annuli 5 are preferably spaced to double the thread pitch whereby the same engages every other thread of the work piece. The annuli of each roll are offset one-third pitch from the annuli of the adjacent rolls (when three rolls are used) to compensate for the lead of the thread to be gauged.

The rolls 4 are mounted each on a post 6 seated in the body 1 and held therein by a nut 7. The nut holds the flange 8 of the post seated securely against the face of the body 1. The roll supporting portion 9 of the post is eccentric to the portion engaged in the body 1 at the opposite side of the flange. Each roll can be adjusted laterally by engaging a screw-driver in the slot 10 and rotatably adjusting the post. Washers 11 and screws 12 secure the rolls in position on the posts. The length of the portion 9 is such that when the washer is securely seated thereon the roll is free to rotate but prevented from movement axially.

It will be noted that, as illustrated in the drawings, the posts 6 are all seated parallel in the body member 1 and the gaging rolls are taper ground to a fine accuracy to correspond to the taper of the piece to be gauged. The adjacent faces of the rolls are, therefore, tapered inwardly to threadedly engage the taper threaded piece with precision as shown in the drawing, i. e., the distance between the adjacent contact faces of the rolls becomes shorter inwardly on in the direction in which the piece to be gauged is inserted.

Threaded into the body 1 between each two adjacent gauging rolls is a limit gauging plug 13. The outer end of each such plug is a perfect flat. The height of each plug can be adjusted by engaging a screw driver in the slot 14 and rotating the plug. Sealing wax 15 may be placed in the bore to prevent tampering when the plug has been properly adjusted. These plugs are respectively adjusted to indicate the minimum, nominal and maximum limit positions of the end of the piece to be gauged and the face of the gauge is preferably stamped to indicate these three limits. Plugs 16 are seated in the body 1 outside of each gauging roll 4 for the purpose of protecting such rolls from injury.

In setting the anvils or rolls 4, a standard plug gauge 25 is screwed into threaded contact with the three rolls 4 until the end of the plug gauge is flush with the face of the nominal limit plug 13. The posts 6 are then rotatably adjusted to accurately engage the annuli of the rolls with the threads of the plug gauge. The nominal limit plug 13 may thereafter be further adjusted if necessary. The standard working tolerances for taper thread are usually one thread plus or minus, hence the maximum and minimum plugs are adjusted to such positions that their faces are respectively the distance of one thread above and below the face of the nominal plug.

The operation of the gauge is believed to be obvious from the above description. As in the ordinary ring gauge, the gauge and work are fully screwed together. To determine the size accuracy, the operator then observes the position of the end of the piece relative to the limit plugs 13. Should the piece end be between the faces of the minimum and maximum plugs, the piece is acceptable. Should the piece end be outside these limits, the piece is rejected as being too small or too large. The accuracy of the piece in regard to form of thread, lead and taper can be determined by observing the contact of the rolls 4 with the threads of the piece, in the manner shown in Fig. 2.

While the advantages of my improved gauge are numerous, I would particularly mention the great advantages of durability and visibility. Whereas in the ordinary ring gauge the threads of the gauge are constantly in frictional contact with the piece being gauged, in my improved gauge just described, the gauging elements are in rolling contact with the piece being gauged, thus making for great durability. The visibility feature of my gauge is obvious by reference to Fig. 2, whereas the ordinary ring gauge provides no visibility whatever between the gauge and the threads being gauged.

It is understood that my invention is capable of various modifications and in Figs. 4 and 5 I have illustrated a modified form of the taper thread gauge just described. In this form of the invention three gauging anvils 17 are mounted to slide radially in one face of the body member 18. The inner and adjacent ends of these anvils are taper ground to accurately correspond to the taper of the piece to be gauged and provided with gauging ribs 19 corresponding to the accurately formed threads of such piece. Each element 17 has a projection 20 extending into the body 18 and threadedly engaged by a screw 21. This screw is journaled to a lug 22 in such manner that the screw can be rotated but not moved axially. The anvils can thereby be adjusted radially to the proper gauging position. The ends of the bores may be filled with sealing wax 23 to prevent tampering when the proper adjustments have been made.

Cooperating with the element 17 are maximum, minimum and nominal flats 24. These flats correspond to the plugs 13 except that the flats 24 are illustrated as formed directly on and as a part of the body member 18 and, therefore, not adjustable. The operation of this form of gauge is substantially the same as that first above described and will, therefore, be readily understood.

In Figs. 6 and 7 I have illustrated a further form of my invention, including a modified gauge body and gauging anvils and the mounting of the anvils on the body. In this construction the gauge body 30 is preferably of annular shape and has a centrally disposed opening 31 therein. The entire peripheral portion of the body comprises a central web 32 and equally disposed thereon about the edge of the opening 31 are three chambers 33 for housing the gauging anvils 34. Each of these chambers opens freely into the central opening 31 and has a pair of end walls 35.

The anvils 34 are cylindrical rolls adapted to gauge cylindrical work and means is provided on the rolls themselves for determining the maximum and minimum limits of size accuracy of the work piece. It will be noted that each roll 34 has a relatively long portion 34a of one diameter and an adjacent and shorter portion 34b of a larger diameter. In the gauging operation the work piece comes first into contact with the portions 34a and thereafter against the portions 34b. If the piece extends between the portions 34a and abuts against the portions 34b but is too large to pass between the portions 34b the piece is acceptable. If the work piece will pass between the portions 34b it is too small and is rejected, and if it will not pass between the portions 34a it is too large and is likewise rejected. The two diameter portions of the rolls themselves, therefore, become the means for determining the maximum and minimum limits of size accuracy of the piece to be gauged.

Each roll 34 is mounted on a bushing 39 whose ends are journaled in the end walls 35. The central portion of each bushing on which the roll is mounted is eccentric so that the position of the roll radially of the gauge may be adjusted by rotatably adjusting the bushing. A locking pin 36 extends through each bushing and threadedly engages a nut 37 within an opening 38 countersunk in the bushing. By reference to Fig. 6 it will be seen that the gauging rolls extend for a considerable distance into the central opening 31, also by reference to Figs. 6 and 7 it will be clear that, the portions of the gauge body intermediate the chambers 33 being relatively narrow, the contact engagement between the rolls and the piece being gauged may be freely observed.

The gauge with cylindrical rolls is placed over the work in the same manner as above described in reference to the taper gauge, this operation in the thread gauge being substantially the same as with the conventional ring thread gauge. Among the advantages of my improved gauge over the ring gauge heretofore known may be mentioned the following: (1) visibility of the contact between the gauge and threads of the work piece, (2) durability, and (3) lightness and therefore ease and convenience of use. In the gauging of straight threads with my improved gauge the following thread elements and conditions are checked: (1) pitch diameter, (2) thread lead, (3) correctness of thread form, (4) straightness of the work piece, and (5) uniformity of thread or the presence of "drunkenness" in the thread. A "drunken" thread is one in which the lead is not regular, the thread being to one side or wavy from its normal position. A caliper type thread gauge, usually called a snap gauge, does not readily detect this condition and neither does the conventional ring thread gauge because the contact between the gauge and the piece being gauged is hidden. In my "tri-roll" gauge herein disclosed the contact is open to view and the irregularities in lead can be seen in the engagement between the correctly spaced and positioned gauging anvils or rolls and the screw thread being gauged.

In Figs. 8 and 9 I have illustrated the gauge shown in Figs. 6 and 7 and just described as provided respectively with a plain cylindrical gauging roll 40 and a threaded cylindrical gauging roll 41, the latter being provided with annular thread gauging ribs 42. The function of the gauge with these rolls is substantially the same as has already been described, the gauge being applied to the end of the work piece in a manner engaging the peripheral surfaces of the rolls with the peripheral surface of the piece. Relative to the rolls 41, however, it should be stated that the ribs 42 on each roll are offset from the corresponding or cooperating ribs of the adjacent rolls a part of the thread pitch proportionate to the distance between such rolls, i. e., when three rolls are used the ribs are offset the distance of one-third thread pitch.

In Figs. 10 and 11 I have illustrated the gauge shown in Figs. 6 and 7 and just described as provided with a plain conical gauging roll 45 and a threaded conical roll 46, the latter being also provided with annular thread gauging ribs 47. I have, furthermore, illustrated means, herein shown as lugs 48 on the gauge body, for determining the maximum and minimum size accuracy of the piece being gauged. The operation of this gauge is substantially the same as has been above described in connection with the gauges shown in Figs. 1 to 7 inclusive. The gauge is placed over the work piece so that the gauging faces of the anvils or rolls rest on the outer peripheral surface thereof. The maximum and minimum limits are determined by observing the position of the end of the work piece relative to the outer flat faces 49 of the lugs 48. The location of the lugs 48 on the back side of the gauge body is indicated in broken lines on the gauge illustrated in Fig. 6.

Having thus described my invention, what I claim as new and desire to secure by Letters Patent is:

1. A gauge comprising a substantially flat body member, three gauging anvils individually mounted thereon in equally spaced relation, said anvils extending substantially normal to the body member and adapted to receive therebetween and make a three point gauging contact with a piece to be gauged, and individual adjusting means for the position of one of said anvils relative to the others.

2. A gauge comprising a substantially flat body member, and three freely rotatable gauging rolls individually mounted in equally spaced relation thereon, said rolls extending substantially normal to the body member and adapted to receive therebetween a piece to be gauged and make a three point gauging contact therewith against the peripheral surfaces of the rolls.

3. A gauge comprising a body member, and means, including three anvils fixed against axial movement relative to the body member and individually mounted thereon in such relatively spaced relation as to receive therebetween and make a three point gauging contact with a tapered piece to be gauged, and means outstanding from the body member for determining the maximum and minimum limits of size accuracy of the piece when in gauging position between said anvils.

4. A thread gauge comprising a body member and three freely rotatable gauging anvils mounted thereon in spaced relation to receive therebetween and make a three point gauging contact with a threaded piece to be gauged, the gauging faces of the anvils being grooved to provide thread-engaging ribs and the ribs on each anvil being offset from the cooperating ribs of the adjacent anvils a part of the thread pitch proportionate to the distance between such anvils.

5. A thread gauge comprising a body member and three gauging anvils individually mounted thereon in equally spaced relation and adapted to receive therebetween and make a three point gauging contact with a taper threaded piece to be gauged, the gauging faces of the anvils being circumferentially grooved to provide thread-engaging ribs and the ribs on each anvil being offset one-third thread pitch from the cooperating ribs of the adjacent anvils, and means outstanding from the body member for determining the maximum and minimum limits for size accuracy of the piece when in gauging position between said anvils.

6. A thread gauge comprising a body member and three freely rotatable thread gauging rolls mounted thereon in such position and relatively spaced relation as to receive therebetween a threaded piece to be gauged and to make a three point thread gauging contact therewith, the peripheral surfaces of the rolls being annularly grooved to provide spaced annular thread gauging ribs therearound and the ribs of each roll being offset from the cooperating ribs of the adjacent rolls a part of the thread pitch proportionate to the distance between such rolls.

7. A taper gauge comprising a body member, a plurality of individually attached gauging anvils mounted thereon in such relatively spaced relation as to receive therebetween a tapered piece to be gauged, the gaging faces of the anvils being tapered in a direction to receive the piece, and means carried by the gauge for indicating the size accuracy of the piece when in gauging position between said anvils.

8. A taper gauge comprising a body member, three individually attached gauging anvils mounted thereon in such relatively spaced relation as to receive therebetween and make a three point gauging contact with a tapered piece to be gauged, the gauging faces of the anvils being tapered in a direction to receive the piece, and means carried by the gauge for indicating the size accuracy of the piece when in gauging position between said anvils.

9. A taper gauge comprising a body member, a plurality of gauging anvils mounted thereon in such relatively spaced relation as to receive therebetween a tapered piece to be gauged, the inner faces of the anvils being tapered in a direction to receive the piece, and elements carried by the gauge and spaced at such different distances from the gauge body as to indicate the maximum and minimum size accuracy of the piece by reference to the location of such piece while in its gauging position.

10. A taper thread gauge comprising a body member, a plurality of thread gauging anvils mounted thereon in such relatively spaced relation as to receive therebetween a tapered threaded piece to be gauged, the adjacent faces of the anvils being tapered longitudinally and grooved transversely to threadedly engage the said piece, and adjustable means carried by the gauge for indicating the size accuracy of the piece when in gauging position between said anvils.

11. A taper thread gauge comprising a body member, three thread gauging anvils mounted thereon in such relatively spaced relation as to receive therebetween and make a three point thread gauging contact with a tapered threaded piece to be gauged, the adjacent faces of the anvils being tapered longitudinally and grooved transversely to threadedly engage the said piece, and adjustable means carried by the gauge for indicating the size accuracy of the piece when in gauging position between said anvils.

12. A taper thread gauge comprising a body member, a plurality of thread gauging anvils mounted thereon in such relatively spaced relation as to receive therebetween a tapered threaded piece to be gauged, the adjacent faces of the anvils being tapered longitudinally and grooved transversely to threadedly engage the said piece, and means providing maximum and minimum elements on and spaced at different distances from the body member for indicating the maximum and minimum limits of size accuracy of the piece being gauged.

13. A taper thread gauge comprising a body member, three relatively spaced gauging rolls mounted on parallel axes thereon, the peripheral surfaces of the rolls being circumferentially grooved and conical in a manner adapted to form a three point threaded contact with a tapered threaded piece to be gauged, and means carried by the body for indicating the size accuracy of the piece while it is thus engaged.

14. A gauge comprising a body member, and three individually adjustable gauging anvils mounted thereon and extending normally from one face thereof in such relatively spaced relation as to receive therebetween and make a three point gauging contact with a piece to be gauged.

15. A taper gauge comprising a body member, and three gauging anvils mounted thereon and extending outwardly from one face thereof in relatively spaced relation, the inner gauging faces of the anvils being tapered inwardly to receive therebetween and make a three point gauging contact with a tapered piece to be gauged.

16. A thread gauge comprising a body member, and three freely rotatable gauging anvils mounted thereon and extending outwardly from one face thereof in such relatively spaced relation as to receive therebetween a threaded piece to be gauged, the gauging faces of the anvils being circumferentially grooved in a manner making a three point thread gauging contact with the piece to be gauged.

17. A gauge comprising a body member, three individually adjustable and freely rotatable gauging rolls mounted thereon and extending normally outwardly from one face thereof in such relatively spaced relation as to receive therebetween and make a three point gauging contact with the piece to be gauged.

18. A thread gauge comprising a body member, a plurality of relatively spaced tapered gauging rolls, means including eccentric elements mounting the rolls on the body in such manner that they extend outwardly therefrom, rotary adjustment of the eccentric elements being adapted to laterally adjust the rolls, means for securing the eccentric elements in adjusted position, the peripheral surfaces of the rolls being annularly grooved to threadedly simultaneously engage a taper threaded piece to be gauged, and studs outstanding from said body member for determining the size accuracy of the piece being gauged.

19. A taper gauge comprising a body member, three gauging anvils mounted thereon and extending outwardly from one face thereof in relatively spaced relation, the inner gauging faces of the anvils being tapered inwardly to receive therebetween and make a three point gauging contact with a tapered piece to be gauged, and means providing maximum and minimum limits on the gauge spaced at adjustable distances from the body member for indicating the maximum and minimum limits of size accuracy of the piece being gauged.

CHARLES G. JOHNSON.